United States Patent Office 3,471,557
Patented Oct. 7, 1969

3,471,557
PREPARATION OF β-CHLOROISOBUTYRYL
CHLORIDE
Thomas H. Coffield, Farmington, and John C. Wollensak,
Royal Oak, Mich., assignor to Ethyl Corporation, New
York, N.Y., a corporation of Virginia
No Drawing. Filed June 22, 1966, Ser. No. 559,398
Int. Cl. C07c 51/58
U.S. Cl. 260—544                                      8 Claims

ABSTRACT OF THE DISCLOSURE

β-chloroisobutyryl chloride is prepared by reacting 1,2-dichloropropane and carbon monoxide in the presence of aluminum chloride and optionally hydrogen chloride. The product is useful as a chemical intermediate for preparing methyl methacrylate, a valuable monomer.

---

This invention relates to a process for the preparation of β-chloroisobutyryl chloride.

It has unexpectedly been discovered that β-chloroisobutyryl chloride can be prepared by reacting a reaction mixture consisting substantially of 1,2-dichloropropane, HCl, CO, and aluminum chloride; at a temperature of from about 40° to about 200° C., and at a pressure selected from pressures of from 250 to about 500 p.s.i.g. and pressures of from about 4000 to about 8000 p.s.i.g. It has also been discovered that hydrogen chloride can be eliminated from the reaction mixture, and that the same product is obtained.

The unexpected nature of this process is clear from Gresham et al., U.S. 2,570,793, which teaches that in the absence of hydrogen fluoride, secondary organic chlorides fail to react with carbon monoxide. In addition, U.S. 2,570,793 teaches that neither aluminum chloride nor HCl promote the reaction of 1,3-dichloropropane with carbon monoxide.

In the process of this invention it is only necessary to contact the reactants at a temperature which allows the reaction to proceed and which has no deleterious effect upon the reactants or desired product. In general, temperatures within the range above-mentioned can be employed. The preferred range is from 35° to 80° C.

The process of this invention is carried out under elevated pressures. Moderate pressures of from 250 to about 500 p.s.i.g. can be employed. Similarly, high pressures of from about 4000–8000 p.s.i.g. can be used.

A solvent is unnecessary. If desired, an excess of propane dichloride can be used. Moreover, inert, organic solvents, for example, carbon tetrachloride, can be employed. Solvents such as nitromethane and carbon disulfide are, in general, not desirable, since in many instances they substantially decrease the yield. For example, in one preparation using carbon disulfide, only 18 percent of desired product was obtained.

The time of the reaction is not a truly independent variable, and it depends to some extent upon the other reaction conditions used. In general, times from about 5 minutes to three hours are effective.

The mole ratio of the various reactants is not critical. The yield does depend to some extent on the amount of aluminum chloride; with less aluminum chloride, lower yields are obtained. It is preferred that at least one mole of aluminum chloride be employed for each mole of 1,2-dichloropropane. As above stated, hydrogen chloride is not an esssential ingredient in the process of this invention. When it is used, however, it is preferentially employed in excess. Up to 7 or 10 or more moles of hydrogen chloride per mole of 1,2-dichloropropane can be employed.

It appears that a reaction is favored to some extent by low carbon monoxide pressures. For example, at 525 p.s.i.g., a yield of 53 percent of desired product was obtained, whereas at 4000 p.s.i.g. and otherwise identical conditions, the product yield was only 48 percent. Similarly, when this process was carried out using a mole ratio of dichloropropane:aluminum chloride:HCl equal to 1.0:0.5:3.3, the yeld of desired product was 65 percent. With a ratio of 1.0:0.5:0.0) (no HCl) the yield was 45 percent. (Both yields based on AlCl$_3$.)

The product is conveniently isolated from the reaction mixture as methyl β-chloroisobutyrate. This is obtained by treating the reaction mixture with methanol. Methyl β-chloroisobutyrate can be transformed to methyl methacrylate using sodium methoxide, carbon black or other catalyst. Methyl methacrylate is a valuable monomer. This illustrates one utility of the process of this invention.

To further illustrate this invention the following non-limiting examples are set forth. Unless otherwise indicated, all parts are by weight.

EXAMPLE 1

A mixture of 96 parts (0.85 mole) of 1,2-dichloropropane, 113.4 parts (0.85 mole) of aluminum chloride, 130 parts of carbon tetrachloride, 46 parts (1.26 mole) of hydrogen chloride and 4000 p.s.i.g. of carbon monoxide, was stirred and heated in a suitable autoclave. Upon reaching 60° C., a rapid temperature rise to 75° C. and a pressure drop of about 400 p.s.i.g. occurred. After 1.75 hours at 75° C., no further pressure drop was noted.

The resultant mixture was then cooled to 10° C. and the gases were vented from the autoclave. A small portion of the mixture was lost during the collection procedure.

The autoclave was rinsed with 85 parts of diethyl ether and this was combined with the reaction mixture. The resultant solution was stirred at 10° C. while nine moles of methanol were added dropwise under a nitrogen atmosphere. Heat evolution was noted during the addition. The resultant slurry was filtered through Celite.

Low boiling volatiles were removed by reduced pressure distillation. The volatiles were distilled, the initial distillate being mainly water plus ester having a boiling point of 35–50° C. at 140 mm. Hg. This distillate was poured into an excess of saturated sodium chloride aqueous solution and then extracted with 140 parts of diethyl ether. The ether extract was dried over magnesium sulfate and then filtered.

Further distillation yielded 25 parts of ester, boiling point 82–84° C. at 60 mm. Hg. This boiling point and NMR analysis confirmed that the product was methyl β-chloroisobutyrate. The total yield of ester was 51 percent.

*Analysis.*—Calculated for $C_5H_8O_2Cl$: C, 43.9; H, 6.5; Cl, 26.0. Found: C, 43.5; H, 6.67; Cl, 26.3.

Similar results are obtained using a CO pressure of 3700 and 8000 p.s.i.g.

EXAMPLE 2

A mixture of 113 parts of 1,2-dichloropropane, 66 parts of aluminum chloride and 4000 p.s.i.g. of carbon monoxide was stirred and heated in a suitable autoclave to 50° C. A rapid pressure drop ensued. After heating the mixture quickly to 75° C. it was then cooled to 70° C. and collected. The mixture and autoclave washings were combined and esterified as in Example 1.

Vapor chromatographic analysis of the resultant product indicated that 48 parts of methyl β-chloroisobutyrate were present. This is a yield of 45 percent.

EXAMPLE 3

A mixture of 113 parts of 1,2-dichloropropane, 66.6 parts of aluminum chloride, 21 parts of hydrogen chloride, and 500 p.s.i.g. of carbon monoxide was stirred and heated to 60° C. in a suitable autoclave. The pressure dropped 100 p.s.i.g. and the temperature increased to 75° C.

After five minutes at 75° C., the mixture was cooled to 9° C. and the gases were vented. The autoclave was washed with 146 parts of carbon tetrachloride and then the esterification was carried out using 128 parts of methanol.

The resultant slurry was filtered and the filtrate was washed with 600 parts of 5 percent HCl. After drying over magnesium sulfate, the filtrate was filtered. Vapor chromatographic analysis demonstrated that methyl β-chloroisobutyrate was prepared in 53 percent yield.

The process of this invention can be extended to the use of 1,2-dibromopropane instead of 1,2-dichloropropane.

Similar results are obtained using carbon monoxide pressures of 250 and 525 p.s.i.g. Similar results are obtained using temperatures of 40° C. and 200° C.

Having fully described the process of this invention and the utility of the product produced thereby, it is desired that this invention be limited only by the lawful scope of the appended claims.

What is claimed is:

1. A process for the preparation of β-chloroisobutyryl chloride, said process comprising reacting a reaction mixture consisting substantially of 1,2-dichloropropane, HCl, CO, and aluminum chloride; said process being carried out at a temperature of from about 40° to about 200° C., and at a pressure selected from pressures of from 250 to about 500 p.s.i.g. and from pressures of from about 4000 to about 8000 p.s.i.g.

2. A process for the preparation of β-chloroisobutyryl chloride, said process comprising reacting a reaction mixture consisting substantially of 1,2-dichloropropane, CO, and aluminum chloride, said process being carried out at a temperature of from about 40° to about 200° C., and at a pressure selected from pressures of about 250 to about 500 p.s.i.g. and pressures of from about 4000 to about 8000 p.s.i.g.

3. A process of claim 1 being conducted at a pressure of from about 4000 to about 8000 p.s.i.g.

4. A process of claim 3 being conducted at a temperature in the range of from 60 to about 75° C.

5. A process of claim 4 being conducted in the presence of carbon tetrachloride solvent.

6. A process of claim 1 being conducted at a pressure of from about 250 to about 500 p.s.i.g.

7. A process of claim 1 being conducted at a temperature of from about 60 to about 75° C.

8. A process of claim 2 being conducted at a temperature of about 50 to about 75° C.

References Cited

UNITED STATES PATENTS

| | | | |
|---|---|---|---|
| 2,411,982 | 12/1946 | Theobald et al. | 260—544 |
| 2,580,070 | 12/1951 | Brooks et al. | 260—544 |
| 1,891,930 | 12/1932 | Hopff et al. | 260—544 |

JAMES A. PATTEN, Primary Examiner

E. GLEIMAN, Assistant Examiner

U.S. Cl. X.R.

260—486, 487